United States Patent
Olson

(10) Patent No.: US 6,886,858 B2
(45) Date of Patent: May 3, 2005

(54) AIR BAG ASSEMBLY WITH TETHERS IN A WOVEN CUSHION AND METHOD OF CONSTRUCTION

(75) Inventor: Mark O. Olson, Farmington Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 77 days.

(21) Appl. No.: 10/206,782

(22) Filed: Jul. 26, 2002

(65) Prior Publication Data

US 2004/0017070 A1 Jan. 29, 2004

(51) Int. Cl.$^7$ ............................................. B60R 21/16
(52) U.S. Cl. ................ 280/743.2; 280/749; 280/730.2; 280/728.3
(58) Field of Search ........................ 280/743.2, 749, 280/730.2, 728.3, 243.2

(56) References Cited

U.S. PATENT DOCUMENTS

| | | | |
|---|---|---|---|
| 3,360,015 A | 12/1967 | Hughes | |
| 3,792,873 A | 2/1974 | Buchner et al. | 280/150 |
| 4,944,529 A | 7/1990 | Backhaus | 280/743 |
| 5,094,477 A | 3/1992 | Togawa | 280/743 |
| 5,336,538 A | 8/1994 | Kitamura | 428/35.2 |
| 5,492,362 A * | 2/1996 | Lehman et al. | 280/739 |
| 5,651,395 A | 7/1997 | Graham et al. | 139/390 |
| 5,685,347 A | 11/1997 | Graham et al. | 139/390 |
| 5,788,270 A | 8/1998 | Håland et al. | 280/729 |
| 6,000,442 A | 12/1999 | Busgen | 139/389 |
| 6,145,872 A * | 11/2000 | Soderquist et al. | 280/728.2 |
| 6,170,860 B1 | 1/2001 | Denz et al. | 280/730.2 |
| 6,189,915 B1 * | 2/2001 | Soderquist et al. | 280/728.2 |
| 6,237,943 B1 * | 5/2001 | Brown et al. | 280/730.2 |
| 6,257,616 B1 * | 7/2001 | Nowak et al. | 280/730.2 |
| 6,273,456 B1 | 8/2001 | Heigl | 280/730.2 |
| 6,299,965 B1 * | 10/2001 | Keshavaraj | 428/125 |
| 6,357,788 B2 * | 3/2002 | Kreile | 280/728.3 |
| 6,375,214 B1 * | 4/2002 | Nishikaji | 280/728.2 |
| 6,489,006 B1 * | 12/2002 | Keshavaraj | 428/125 |

\* cited by examiner

Primary Examiner—Eileen D. Lillis
Assistant Examiner—Rashmi Sharma
(74) Attorney, Agent, or Firm—Markell Seitzman

(57) ABSTRACT

The invention relates to an air bag and a method of forming the air bag. The invention comprises the steps of: a) partially constructing the air bag and leaving an opening at a determinable location at or near the periphery of the air bag to provide access to the interior thereof; b) inserting a tether into the interior of the bag through the opening; and c) securing one side of the tether to a first panel of the air bag and securing a second side of the tether to a second panel of the air bag; and closing the access opening.

17 Claims, 5 Drawing Sheets

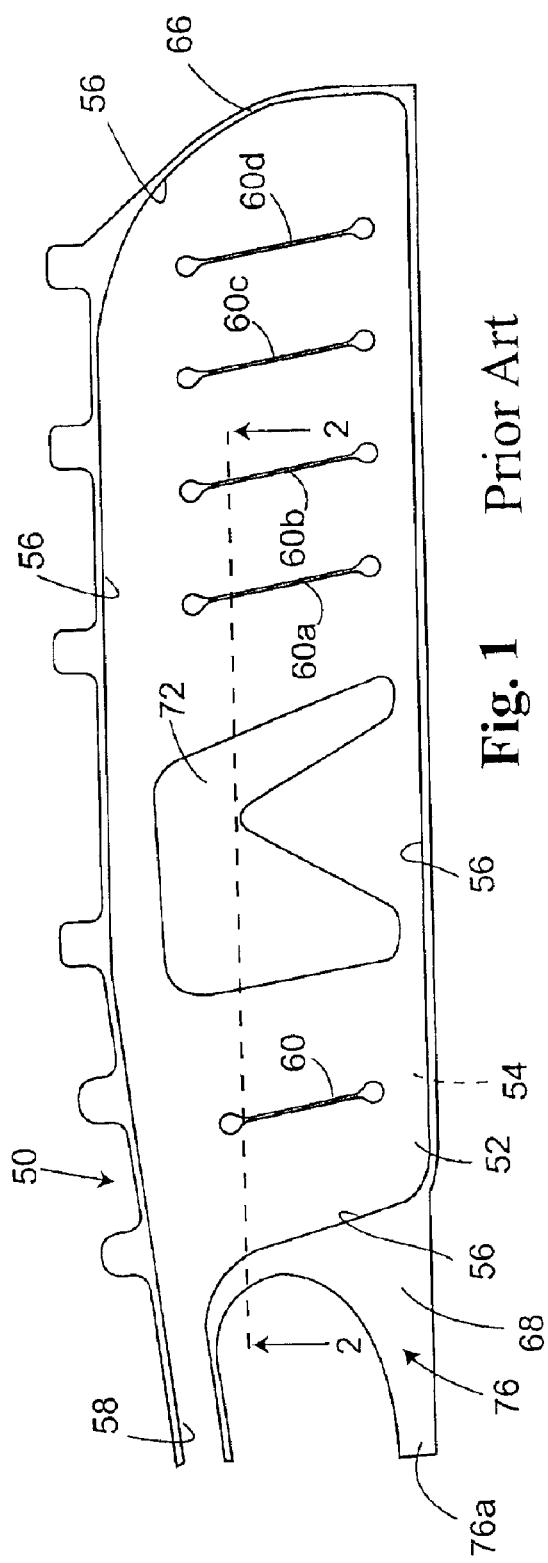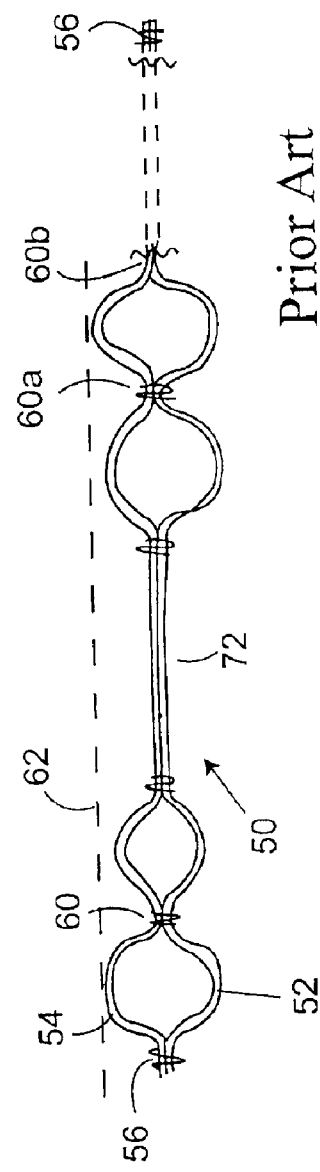
Fig. 1  Prior Art
Fig. 2  Prior Art

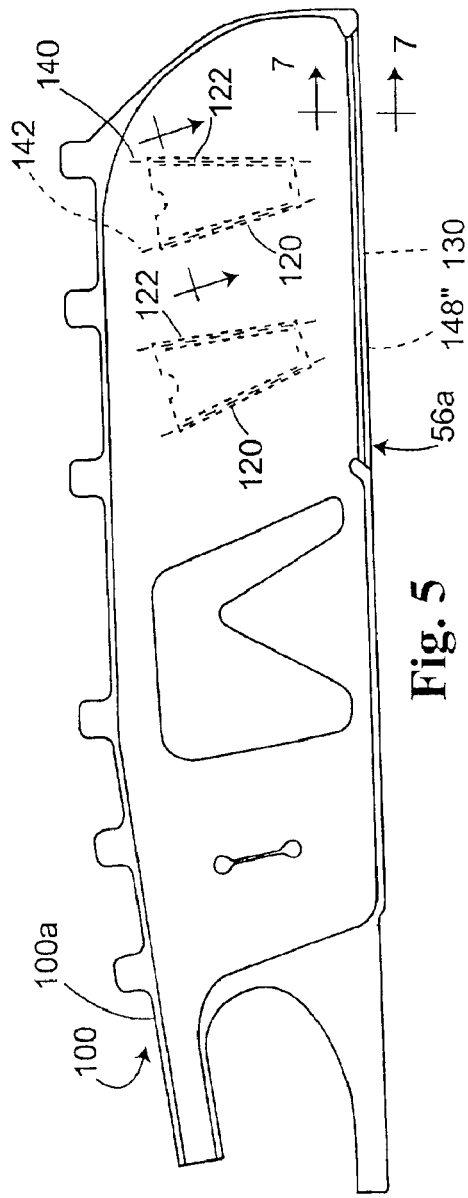
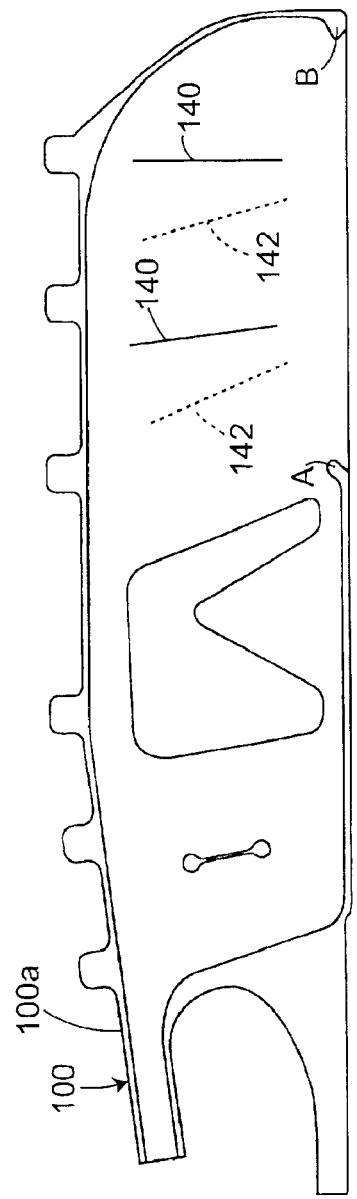
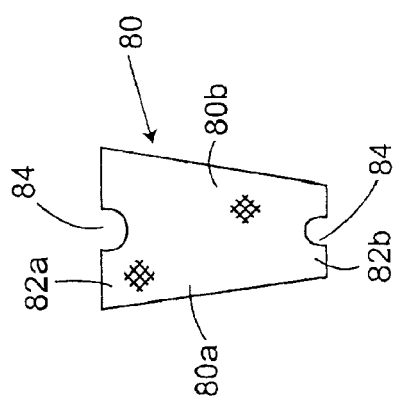
Fig. 4
Fig. 5
Fig. 3

US 6,886,858 B2

AIR BAG ASSEMBLY WITH TETHERS IN A WOVEN CUSHION AND METHOD OF CONSTRUCTION

BACKGROUND AND SUMMARY OF THE INVENTION

The present invention relates to air bags and more particularly to a new construction of the air bags.

Historically air bags have been made by sewing woven fabric together. Depending upon the use of the air bag the woven material might have been coated with material such as silicon or urethane. In order to control of the extension and shape of the air bag many airbags include tethers. For example, the prior art shows an air bag in which the inner panel and outer panel of material are separated by a plurality of tethers. When the air bag is inflated, the inner and outer panels are separated by the length of the tethers. This type of construction has benefits in that the occupant's body, which is typically adjacent the inner panel of material, is maintained a further distance away from the side of the vehicle, which is typically adjacent the outer air bag panel. This type of construction is easily achieved when the various parts of the air bag are sewn together.

The prior art also illustrates air bags can be made by rf (radio frequency) welding various panels of material together or by weaving yarn utilizing a special loom and head, such as a Jacquard head. Dobby looms can also be used to make a functionally similar air bag. As used herein a woven bag is also referred to as a one-piece-woven bag.

One of the issues with the rf (radio frequency) and woven types of air bag construction is that the interior or inner panel and the outer or exterior panel of the air bag are joined together (along a woven or bonded seam). Consequently, in an accident if the occupant hits the air bag in the region of the seam, the occupant might impact the vehicle side (which is adjacent to the outer panel).

It is an object of the present invention to provide an air bag that can be constructed utilizing rf (radio frequency) or woven technologies while still being able to easily include internal tethers.

The invention also relates to a one-piece, integral woven tube or cover into which an elongated, folded curtain air bag can be inserted and stored.

Accordingly the invention comprises: a method of forming an air bag comprising the steps of: a) partially constructing the air bag and leaving an opening at a determinable location at or near the periphery of the partially constructed air bag to provide access to the interior thereof; b) inserting one or more tethers into the interior of the bag through the opening; c) securing one side of each tether to a first panel of the air bag and then securing a second side of the tether to a second panel of the air bag; and d) closing the opening. The invention also includes: a curtain air bag comprising: opposing panels of material joined at a periphery of the air bag along a peripheral seam that substantially extends about the periphery of the air bag, the peripheral seam being open along a determinable length to provide access to the interior of the air bag; a tether having a determinable size, placed within the interior of the air bag through the access opening and having generally opposing first and second sides, the first tether side secured to a first of the air bag panels and a second tether side secured to a second of the air bag panels; and a peripheral seam segment for closing the open portion of the peripheral seam after the tether is secured in place. A final embodiment the invention includes a tubular cover for a folded curtain air bag. The woven cover includes a tear seam, which is integrally formed during the weaving process.

Many other objects and purposes of the invention will be clear from the following detailed description of the drawings.

BRIEF DESCRIPTION OF THE DRAWINGS

FIG. 1 a plan view of a prior art curtain air bag.

FIG. 2 is a cross-sectional view through section 2—2.

FIG. 3 an isolated view of a tether.

FIG. 4 shows a partially completed curtain air bag using the present invention.

FIG. 5 is a plan view of a completed air bag with sewn-in tethers.

DETAILED DESCRIPTION OF THE DRAWINGS

Figure 5A:
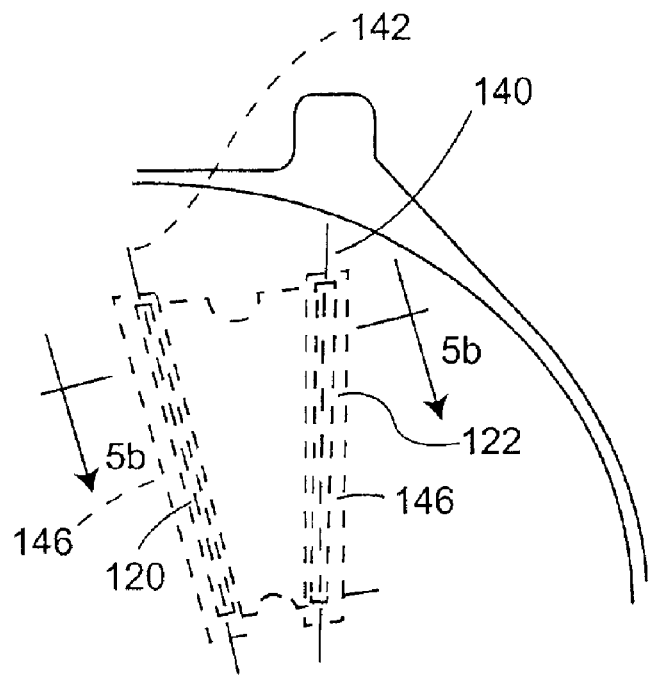
FIGS. 5a and 5b show further details of the air bag of FIG. 5.

Reference is made to FIG. 1, which illustrates a prior art air bag curtain 50. Curtain air bags are illustrative of one type of air bag. The air bag includes inner and outer panel 52 and 54 respectively. The panels are generally joined together along a peripheral seam 56. This seam can be a sewn seam, a bonded seam or a woven seam. The air bag 50 additionally includes an inlet 58, which is connectable to a source of inflation gas (inflator). The extent to which the inner and outer panels are permitted to extend away from each other is limited by a number of interior structures.

For example, the inner and outer panels 52 and 54 can be joined together along seams (or lines) 60, 60a–d or along an area 72 (this area 72 is a non-inflatable zone of the air bag). As can be seen in this exemplary construction, the inner and outer panels are joined directly together (see FIG. 2) along seams 60, 60a–d and along the seam that follows the periphery of area 72.

When the air bag 50 is deployed, the air bag unfolds from its stored orientation and the outer panel 54 will lie against an adjacent vehicle side 62. Because of the zero distance connection between the inner and the outer panels along seams 60, 60a–60d, as well as about region 72, and depending upon inflation pressure, it is possible to collapse (strike through) the air bag in the vicinity of these joined-together areas and impact the vehicle side.

One of the main purposes of joining the panels 52 and 54 together, as described above, is to limit the volume 70 of the air bag 50 that needs to be inflated. This permits a smaller sized inflator to be used to inflate the air bag.

The inlet 58, mentioned above, can be located within a vehicle passenger compartment generally near the A-pillar of the vehicle, while the non-inflated region 72 is located proximate to and slightly behind the B-pillar. End 66 of the air bag is located near the C-pillar of the vehicle. As can be appreciated the bag and its components can be reversed, in which case the end 66 would be located near the A-pillar with the inlet 58 near the C-pillar (or even at the B-pillar). When inflated, the lower portions 68 of the air bag 50 may be loosely positioned relative to the adjacent side of the vehicle or alternatively the air bag may include non-inflatable regions that are used as tethers; one such non-inflatable region is shown by numeral 76. As is known in the art, some curtain air bags include inflatable end tethers or like structures, which can be achieved by constructing a sack at the location of the tether 76 and communicating the sack to the interior of the air bag. An opposing end 76a of the tether 76 can be secured to an adjacent side of the vehicle.

In many situations it is desirable to permit the side panels of the air bag to become spaced from each other when the air bag is inflated. If the air bag 50 is made of a sewn-together construction, it is relatively easy to sew or otherwise insert a tether such as 80 (see FIG. 3) between the inner and outer panels 50 and 54. This type of tether is sometimes referred to as a 3-D tether. With the use of a 3-D tether, the inner and outer panels are allowed to move apart (by a distance equal to the width of the tether) when the air bag is inflated, thereby insuring the occupant stays further away from a hard surface such as the adjacent vehicle side (side panel or trim).

Reference is now made to FIG. 4, which illustrates the air bag 100 constructed using the present invention. The general shape of air bag 100 is very similar if not identical to that of air bag 50. The present invention assembly process first partially constructs the air bag 100, then one or more tethers 80 are added to the partially constructed bag, and the air bag is then completed. The partially constructed air bag is designated by numeral 100a.

The partially constructed air bag 100a, in general, can be achieved by weaving the bag 100a, which has some advantages. For example, in a one-piece-woven operation the bag would be removed from the loom in an almost complete state. The capital investment to make a woven bag is greater than that of a sewn bag but the labor cost is less. Ultimately, the bag as taken from loom will be coated with urethane or silicon to control the permeability of the bag and then completed in accordance with the present invention. The inner and outer panels 52 and 54 can be joined together by other appropriate means such by rf welding (or even sewing) the panels together. Regardless of the process used to make the partially constructed bag, the panels are secured together. In the preferred embodiment of the invention the bag is integrally woven, however the peripheral seam 56 does not extend completely about the periphery of the air bag.

As can be seen in FIG. 4, the peripheral seam 56 is absent between points A and B. This partial construction defines an access opening 102 to the interior of the partially constructed air bag 100a. As will be seen, the 3-D tether 80 will be inserted within the partially completed air bag through this access opening.

Reference is again made to FIG. 3, which illustrates one of the 3-D tethers 80. As illustrated, the tether 80 is trapezoidal in shape having sides 80a and 80b and ends 82a and 82b. Each of the ends 82a and 82b includes an optional notch 84, which reduces stress concentration at the ends of the tether.

Reference is again made to FIG. 4. As an assembly aid, the bag 100a includes marking lines on both of its side panels 52 and 54 respectively. For example, one such marking line 140 is located on panel 52 at the desired location of each seam used to secure a tether to panel 52. Additionally, another marking line, such as 142, is placed on panel 54 at the desired location of each seam used to secure a tether 80 to panel 54. FIG. 4 shows two such marking lines 140 and 142, which will secure two tethers 80 to the air bag 100a (of course more tethers can be used). If the partially constructed air bag 100a is made using one-piece woven technology, the marking lines are formed using colored (preferably a contrasting color) yarn, which is integrally woven into each panel 52 and 54. If woven into the bag, the marking lines 140 and 142 will be visible from either side of each panel 52 and 54. The marking lines 140 and 142 can also be printed or painted thereon.

Prior to attaching the tethers 80, the flexible air bag panels 52 and 54 are separated (at opening 102) to permit the operator to gain access to the interior of the air bag 100a. Thereafter the operator aligns side 80a of tether 80 to the marking line 142 (in panel 54) and then secures side 80a to panel 54 along seam 120 (which runs along the marking line 142). As used herein the seam 120 can be achieved by rf welding side 80a to panel 54 or alternatively sewing side 80a to panel 54. In the preferred embodiment of this invention the tethers are sewn onto a partially woven bag. The process is repeated for as many tethers as are being used, that is, each tether is sewn to a corresponding marking line 142 in panel 54. Thereafter the air bag 100a is turned upside down such that panel 52 is placed upon the work surface. Side 80b of the tether 80 is aligned to a marking line 140 in panel 52 and appropriately secured along seam 122 (which extends along marking line 140). The seam 122, as with seam 120, can be of an rf or of a sewn construction. If permeability of a sewn seam is of concern, that is, if the use of a sewn seam may increase the permeability of the air bag to an unacceptable level, each seam 120 and 122 can be reinforced or sealed to limit the air bag thereacross. FIG. 5 shows the air bag of FIG. 4 with two sewn-in tethers 80.

Figure 5B:
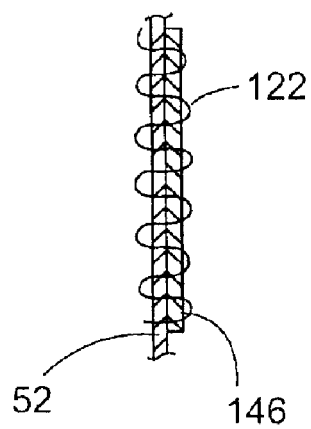
Figure 6:
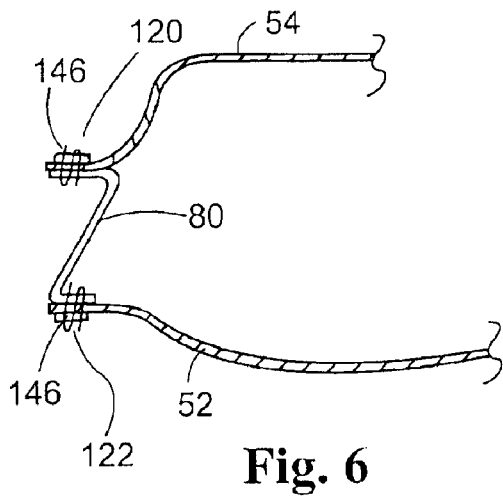
FIG. 6 is a partial cross-sectional view showing an inflated air bag with sewn-in tethers.

The air flow across a sewn seam (that is the air flow through the needle and thread holes) can be reduced (assuming it is an issue) by first placing an adhesive (pressure sensitive or heat sensitive) tape segment 146 to the outside of each panel 52 and 54 at the location of seam 120 and 122 (at the location of the marking lines 140 and 142) as shown in FIGS. 5a and 5b. In the present invention the use of the tape segments 146 is optional. The sewing threads forming seams 120 and 122 will extend through the respective tether side (which is attached to the inside of each panel 52 and 54) as well as through and about respective tape segments (if used). As an alternative to placing an adhesive tape on the outside of the panels, a double-sided pressure or heat sensitive tape can be placed on the inside of one of the panels, such as 52, and then one side of the tether can be placed on the tape and the tethers sewn to the panel. This process is repeated for the other side of the tether. Thereafter the panels and the sides of the tether 80 are ironed together with the application of heat and pressure, at the locations defined by the marking lines 140 and 142. FIG. 6 is a partial cross-sectional view showing one tether 80, which has been sewn to the panels 52 and 54 (the air bag is shown in an inflated condition).

Figure 7:
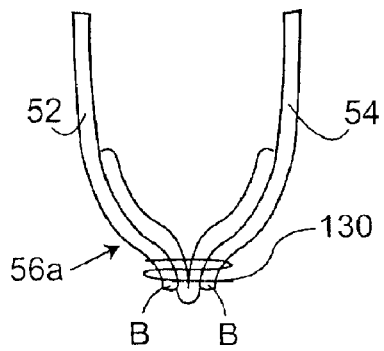
FIG. 7 is a partial cross-sectional view showing a sewn-together seam segment.
Figure 7A:
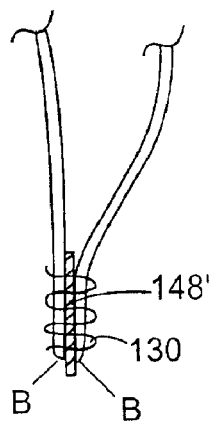
FIG. 7a is a partial cross-sectional view showing a double-sided pressure tape used to close a portion of the air bag.
Figure 7B:
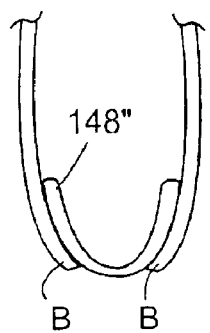
FIG. 7b shows the use of a heat-activated tape.

After the tethers 80 are added to the partially constructed air bag 100a, the missing portion of the peripheral seam, for example portion 56a, is then added to the air bag. This missing segment 56a of seam can be an rf seam 56 or for example the air bag 100a can be closed by sewing the air bag such as by joining the panels 52 and 54 together with a sewn seam generally shown as 130 as shown in FIG. 7. As before if permeability is a concern, an adhesive tape segment 146 can be placed on or between both panels along the location of seam 130 and the bag sewn closed in a manner similar to that used in FIG. 5b. In the present invention a segment of double-sided adhesive tape 148 can be inserted between the panels 52 or 54 and the panels optionally sewn together at seam 130 (see FIG. 7a). In the preferred embodiment of the invention, an adhesive, heat sensitive tape segment 148" is inserted between points A and B (see FIG. 7b). Thereafter the panels are ironed together, that is with the application of heat and pressure, thereby closing the opening 102.

Curtain air bags (which are usually oblong in shape) can easily be folded into a configuration that is somewhat cylindrical (a small diameter-to-length ratio). The prior art shows that folded curtain air bags can be inserted within an elongated, thin, hollow cylindrical tube of air bag material, which is formed by folding over a length of material and sewing it closed at a seam, which runs opposite to and parallel to the fold. In the present invention it is proposed that this sewn cylindrical tube can be replaced by a woven tube, which will be more uniform (that is when comparing one tube to another) and which will eliminate the sewing process. This type of one-piece-woven tube can be manufactured using a Dobby or Jacquard type loom.

Figure 8:
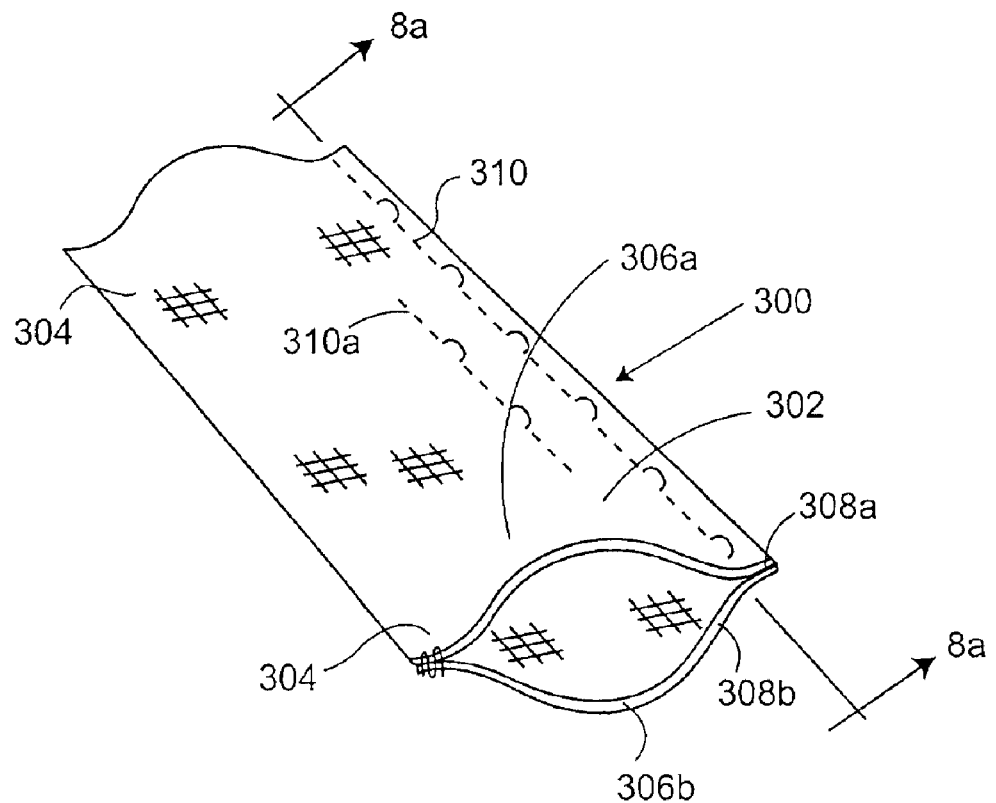
FIG. 8 shows a tearable, woven tubular air bag cover.
Figure 8A:
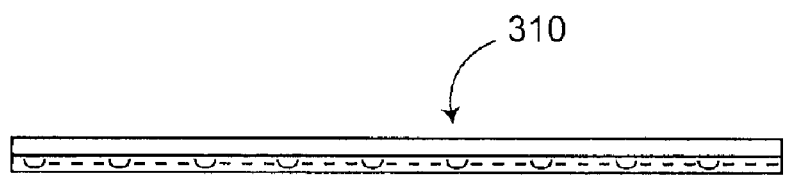
FIG. 8a is a cross-sectional view taken through section line 8a—8a showing a woven-in tear seam.

Reference is briefly made to FIG. 8, which illustrates a woven curtain cover 300 comprising an integrally formed hollow woven tube 302. The tube includes a double thickness seam or border 304 running its length on one side. Two opposing panels 306a and 306b integrally extend from the seam or border 304. The construction of the tube 300 along its side opposite the double thickness border is as follows. The panels 306a and 306b end at opposing single thickness panel sides 308a and 308b. Preferably a single weft or fill thread 310 (or a relatively few weft threads) interconnects each of the sides 308a and 308b, the threads form a tear seam as also shown in FIG. 8a.

As known the prior art teaches tubular covers sewn together along sides analogous to sides 308a and 308b, however the present invention has distinct advantages to sewing these sides together. The thread or yarn, which forms the tear seam, is integrally constructed as part of one of the panels such as 306a and 306b, and during the weaving process this tear seam thread 310 is caused to periodically jump from one panel to another with a pitch that is or can be uneven, at least in contrast with the even and uniform pitch stitch pattern generated by sewing. This construction has advantages over making the cover with a sewn tear seam. If, however, the tear seam is woven into the cover, the tear seam can be made to jump between panel 306a and 306b at arbitrary or uneven intervals as distinguished from a sewn-in tear seam. Additionally the tear seam can be reinforced along various sections of the cover 300. For example, the tear seam can be more densely woven (see the second integrally woven thread 310a, which joins sides 308a and 308b over a short center length) or stronger in the center of the cover 300 than at the ends of the tube, thereby encouraging the tube to open at one or both of the ends.

Many changes and modifications in the above-described embodiment of the invention can, of course, be carried out without departing from the scope thereof. Accordingly, that scope is intended to be limited only by the scope of the appended claims.

What is claimed is:

1. A method of forming an air bag (100) comprising the steps of:
   a) partially constructing the air bag (100a) and leaving an opening at a determinable location at or near the periphery of the partially constructed air bag to provide access to the interior thereof;
   b) inserting a tether into the interior of the bag through the opening;
   c) securing one side of the tether to a first panel of the air bag and securing a second side of the tether to a second panel of the air bag; and
   d) closing the opening.

2. The method as defined in claim 1 wherein the step of partially constructing the air bag includes weaving the air bag to form its various panels and integrally formed seam, which generally extends about a determinable portion the air bag periphery but does not extend across that part of the air bag that defines the opening, which provides access to the interior thereof.

3. The method as defined in claim 2 wherein the step of partially constructing the air bag includes bonding at least one woven panel of material by rf energy.

4. The method as defined in claim 1 wherein the step of partially constructing the air bag includes sewing together at least one woven panel of material.

5. The method as defined in claim 1 wherein the step of partially constructing the air bag includes forming the bag by weaving.

6. The method as defined in claim 1 wherein the step of closing the opening includes one of rf bonding and sewing the opening closed.

7. The method as defined in claim 6 wherein the step of closing the opening includes sewing through a reinforcing tape.

8. The method as defined in claim 7 wherein the reinforcing tape is one of heat sensitive and adhesive.

9. The method of claim 8 wherein at least one segment of double-sided tape is located along the opening.

10. A curtain air bag comprising:
    opposing panels of material joined at a periphery of the air bag along a peripheral seam that substantially extends about the periphery of the air bag, the peripheral seam having an open portion along a determinable length to provide access to the interior of the air bag;
    a tether having a determinable width, located within the interior of the air bag, inserted through the open portion, the tether having generally opposing first and second sides, the first tether side secured to a first of the air bag panels and a second tether side secured to a second of the air bag panels;
    a peripheral seam segment which closes the open portion of the peripheral seam.

11. The device as defined in claim 10 wherein the sides of the tether are angled relative one to the other.

12. The device as defined in claim 10 wherein each tether side is rf bonded to an adjacent panel of the air bag.

13. The device as defined in claim 10 wherein each tether side is sewn to an adjacent panel of the air bag.

14. The device as defined in claim 13 wherein the air bag includes an adhesive tape located on each of the air bag panels at the location of the seam used to sew each tether side to a panel of the air bag.

15. The device as defined in claim 10 wherein the peripheral seam segment is a sewn seam.

16. The device as defined in claim 15 wherein the air bag includes at least one segment of reinforcing tape located at the peripheral seam segment.

17. The device as defined in claim 16 wherein the reinforcing tape includes one of adhesive tape and heat sensitive tape.

* * * * *